United States Patent [19]
Filderman

[11] 3,966,026
[45] June 29, 1976

[54] NOISE-REDUCING SUPPORT FOR FRICTION LININGS OF BRAKING DEVICES

[75] Inventor: René Gabriel Filderman, Asnieres, France

[73] Assignee: Societe Anonyme Francaise du Ferodo, Paris, France

[22] Filed: Dec. 6, 1974

[21] Appl. No.: 530,503

[30] Foreign Application Priority Data
Oct. 17, 1974  France .............................. 74.34890

[52] U.S. Cl. .............................. 188/73.5; 188/73.1; 188/250 B
[51] Int. Cl.² ......................................... F16D 65/02
[58] Field of Search ............. 188/73.1, 73.5, 205 A, 188/250 R, 250 B, 250 E, 250 G, 250 H, 250 F

[56] References Cited
UNITED STATES PATENTS

| | | | |
|---|---|---|---|
| 1,753,208 | 4/1930 | La Brie | 188/250 H |
| 1,781,691 | 11/1930 | Kohr | 188/250 F |
| 1,794,348 | 2/1931 | Chase | 188/250 E |
| 2,381,941 | 8/1945 | Wellman et al. | 188/73.1 |
| 3,064,769 | 11/1962 | Billmeyer | 188/250 R |
| 3,563,347 | 2/1971 | Hahm | 188/250 R |
| 3,885,651 | 5/1975 | Odier | 188/73.5 |

FOREIGN PATENTS OR APPLICATIONS

| | | | |
|---|---|---|---|
| 260,807 | 8/1964 | Australia | 188/205 A |
| 1,253,076 | 10/1967 | Germany | 188/250 B |
| 929,179 | 6/1963 | United Kingdom | 188/250 R |

Primary Examiner—Trygve M. Blix
Assistant Examiner—Edward R. Kazenske
Attorney, Agent, or Firm—Young & Thompson

[57] ABSTRACT

The invention relates to a noise-reducing support for the friction lining of a braking member in which said lining is fixed to said support and is adapted to be clamped against a friction track by the effect of a force applied to said support, this friction track being incorporated for example in a disc or a ring or alternatively in a wheel-drum, especially of an automobile vehicle. According to the invention said support comprises a stack of a plurality of thin metallic sheets or strips, contiguous to each other over their whole surface and all assembled together by glueing, welding in zones, riveting insetting in a rim or flange, etc.

19 Claims, 10 Drawing Figures

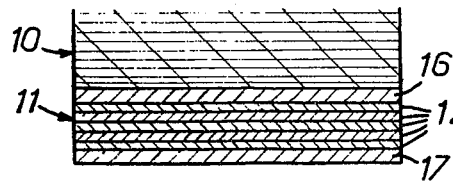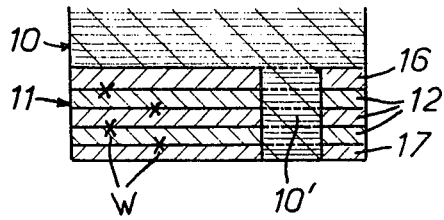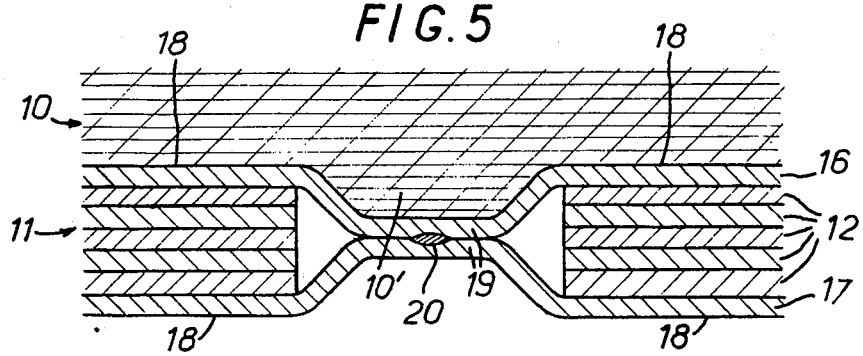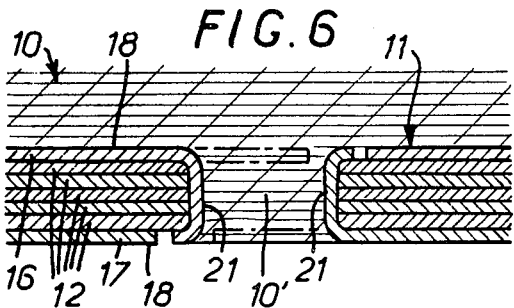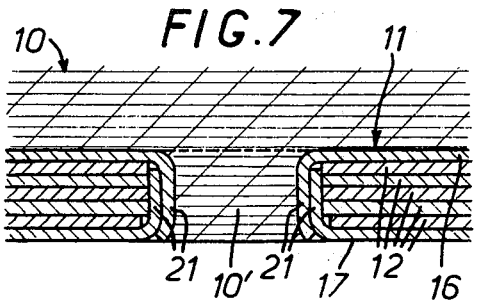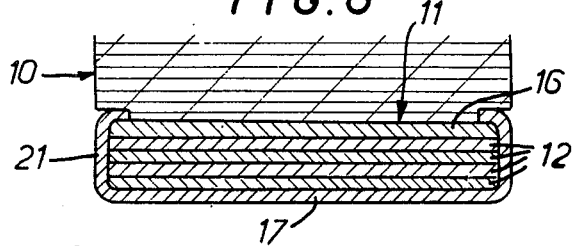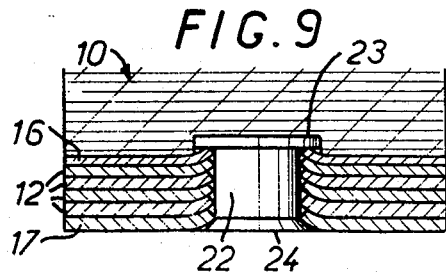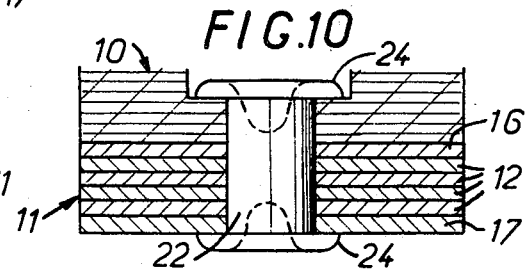

NOISE-REDUCING SUPPORT FOR FRICTION LININGS OF BRAKING DEVICES

The present invention relates to a support for a friction lining of a braking member such as a shoe or a jaw in which the lining is fixed to the support and is intended to be clamped against a friction track by the effect of an action applied on the support. This friction track is for example a disc or a ring or alternatively a wheel-drum, especially of an automobile vehicle.

Braking actions are very frequently noisy. It has been found in practice that in 100 braking operations, 70 are noisy, of which 50 are fairly noisy and 20 very noisy, and this with a given type of brake and vehicle.

The present invention has for its object a noise-suppression support of a friction lining for a braking member, which enables braking to be effected with less noise.

The anti-noise support according to the invention is characterized in that it comprises a stack of a number of thin sheets, all metallic and contiguous with each other over their whole surface, and assembled together.

Experience has shown that brake members comprising such laminated supports enable the braking to be made less noisy. In particular, all other things being equal, in 100 braking operations, only 35 are noisy instead of 70, of which 31 are fairly noisy instead of 50 and only four very noisy instead of 20.

It is possible that these good results are due to the fact that the thin sheets are permitted to move with respect to each other, even to an extremely small extent, and create friction which at least partly dissipates the vibratory energy.

In addition, the laminated structure gives the support greater flexibility which enables the specific pressure of the lining on the friction track to be more uniformly distributed, which is favorable to silent operation.

In one form of construction, the stack of sheets is adjacent to the friction lining, while in an alternative form it is comprised between an inner plate adjacent to the friction lining, and an outer plate.

These plates may be contiguous to the stack and can be assembled with the said stack, or alternatively they may have parts contiguous to the stack and parts either in the shape of a bowl or of an insetting edge.

The sheets may be assembled together by glueing; welding in zones, crimping or riveting. The support receives the fixed lining, especially by glueing, by anchoring, or by riveting.

Forms of embodiment of the invention are hereinafter described by way of example, reference being made to the accompanying drawings, in which:

FIG. 3 is a view similar to FIG. 1, but in which the braking member is a shoe of a ring-brake, and in which the stack of sheets is comprised between an inner plate glued to the friction lining and an outer plate;

FIG. 4 is a view similar to FIG. 3, but in which the lining is fixed on the support by anchorage;

FIG. 5 is a view similar to FIG. 4, but in which the inner and outer plates have bowl-shaped portions;

FIGS. 6, 7 and 8 are respectively concerned with three alternative forms in which at least one of the plates has an insetting edge for the stack;

FIGS. 9 and 10 relate respectively to two alternative forms in which the sheets are assembled together by riveting.

Figure 1:
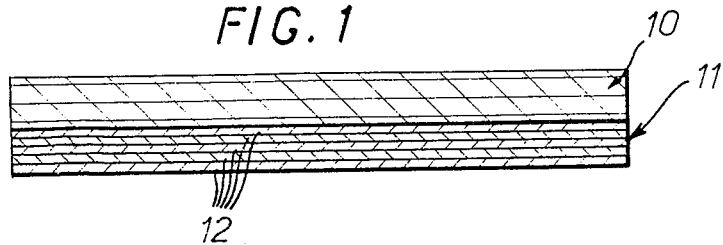
FIG. 1 is a view in cross-section of a braking member constituted by a shoe of a disc-brake, and in which the stack of sheets is adjacent to the friction lining.

Reference will first be made to FIG. 1, in which a disc-brake shoe comprises a friction lining 10 fixed by any appropriate means, for example by glueing, to a support 11 on which are applied the braking actions causing the lining 10 to be forced against a friction track provided on the disc.

The support 11 comprises a stack of several sheets (five in the example shown), all metallic, uniformly flat and contiguous with each other over their whole surface and assembled together. This assembly is effected by glueing in zones in the example shown in FIG. 1. The stack of sheets 12 is adjacent to the friction lining 10 and is fixed thereto also by glueing in the example shown.

The laminations are steel sheets having all the same thickness, comprised between 0.3 mm. and 1.5 mm., and preferably of the order of 1 mm. The glueing of the sheets 12 to each other and of the stack of sheets 12 to the lining 10 is carried out as a whole in one single operation.

With the shoe which has just been described with reference to FIG. 1, it has been found, with a given type of vehicle and with a given type of brake, that in 100 braking operations only 35 were noisy, of which 31 were fairly noisy and only four very noisy. The same test carried out, all other conditions remaining the same, with a shoe having a support which is not laminated, shows that in 100 braking operations, 70 were noisy and of these 50 were fairly noisy and 20 very noisy.

The shoe such as shown in FIG. 1 thus makes it possible to reduce the noise in the brake considerably. It is possible that these good results are due to the fact that the sheets 12, even when glued to each other, can possibly move to an extremely small extent with respect to each other and create a friction which dissipates at least part of the vibratory energy. In addition, the laminated structure gives greater flexibility which permits the specific pressure of the lining 10 to be more uniformly distributed against the disc, and this renders the shoe less noisy.

Figure 2:
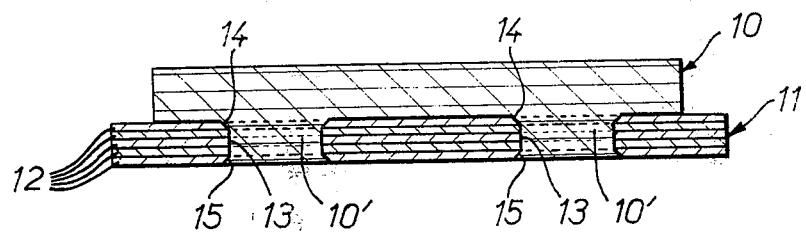
FIG. 2 is a view similar to that of FIG. 1, but relates to an alternative form in which the braking member is a jaw of a drum-brake.

In the alternative form shown in FIG. 2, the arrangement is similar to that which has just been described with reference to FIG. 1, but the braking member is in this case a jaw for a drum brake. This jaw is constituted by a friction lining 10 which is fixed by anchorage at 10′ to the support 11. This support 11 is formed by five steel sheets 12 of 1 mm. in thickness, glued to each other. The sheets 12 are pierced with holes 13 for the anchorage at 10′ of the lining 10. The holes 13 are the same as those which exist on the mass-produced jaws, but are milled at the extremities at 14 and 15 in order to ensure the anchorage.

The lining 10 is furthermore glued on to the support 11. The glueing of the lining 10 and the sheets 12 is carried out in one single operation.

The jaw which has just been described with reference to FIG. 2, having a support 11 with a laminated structure have an operation just as little noisy as that of the shoe of FIG. 1.

Reference will now be made to FIG. 3, in which the arrangement is similar to that described with reference to FIG. 1 or to FIG. 2, but the braking member is in this case a shoe of a ring-brake. In addition, the stack of sheets 12 is comprised between an inner metal plate 16 adjacent to the friction lining 10 and an outer metal plate 17. The plates 16 and 17 have a thickness greater than that of the sheets 12, for example equal to 1 mm., whereas the thickness of the sheets 12 is 0.5 mm. or 0.8 mm.

It will be appreciated that the plates 16 and 17 are uniformly flat and contiguous to the stack of sheets 12 and are assembled with this stack. The assembly of the various parts 10, 16, 12 and 17 is carried out by glueing in one single operation. It will thus be clear that the plates are assembled by the same assembly means as those which assemble together the sheets.

In the alternative form shown in FIG. 4, the stack of sheets 12 comprises only three laminations and is comprised on the one hand between the inner plate 16 which has a thickness greater than that of the sheets, and on the other hand the outer plate 17 which in this case has the same thickness as the sheets. The lining 10 is fixed to the support 11 thus constituted by anchorage at 10'. The assembly of the plates 16, 17 and the sheets 12 is effected by localized junction means, and in particular by welding by zones W.

Reference will now be made to FIG. 5, in which the inner plate 16 and the outer plate 17 have portions 18 which are uniformly flat and contiguous to the stack of sheets 12 and bowl-shaped portions 19. The bowls 19 are convex with respect to each other and adjacent, and are fixed to each other for example by a weld 20. It will be appreciated that the bowls 19 of the inner plate 16 form an anchorage means at 10' for the lining 10.

In the form of embodiment shown in FIG. 6, each of the plates 16 and 17 is provided with at least one portion 18 uniformly flat and contiguous to the stack of sheets 12, and at least one portion 21 in the form of an insetting edge for the stack of sheets 12. The portions 21 of the plate 16 and the plate 17 form between each other a passage for the anchorage at 10' of the lining 10.

In the alternative form shown in FIG. 7, the end portions 21 of the plates 16 and 17 overlap each other, which permits a double insertion and always forms a passage for the anchorage at 10' of the lining 10.

In FIG. 8, the plate 16 is uniformly flat and contiguous to the stack of sheets 12, and receives the lining 10 by glueing. Only the plate 17 is given the turned-back edge 21 for the insertion of the stack of sheets 12.

In the form of construction shown in FIG. 9, the sheets 12 are assembled together by riveting at 22. The rivet 22 is provided with a head 23 and a riveting snap 24, this latter being at the level of the outer face of the support 11.

In the alternative form shown in FIG. 10, the sheets 12 are also assembled together by riveting, but the rivets 22 comprise two snap-heads 24 at their extremities.

In addition, it is the rivets 22 which assemble together the lining 10 and the support. It will be noted that it is the same rivets 22 which thus assemble the lining 10, the sheets 12 and the plates 16 and 17 together in this way.

It will be understood that the various arrangements which have just been described with reference to each of FIGS. 1 to 10 are each applicable wholly or partly both to shoes for disc-brakes and to shoes for ring-brakes or to the jaws of drum-brakes, and that any arrangement described with reference to any one of FIGS. 1 to 10 is applicable wholly or partly to the cases of the other figures, and this without departing from the scope of the invention.

What I claim is:

1. A noise-reducing support for a friction lining of a braking member in which said lining is fixed to said support and is adapted to be clamped against a friction track by the effect of an action applied on said support, said support comprising a stack of a plurality of sheets, all metallic, contiguous to each other over their whole surface being placed between a metal inner plate adjacent said lining and a metal outer plate, both plates having a portion contiguous to said stack of sheets, and localized junction means assembling together all of said sheets.

2. A support as claimed in claim 1, in which the thickness of said metallic sheets is comprised between 0.3 mm. and 1.5 mm.

3. A support as claimed in claim 2, in which said thickness is of the order of 1 mm.

4. A support as claimed in claim 1, in which said metallic sheets have all the same thickness.

5. A support as claimed in claim 1, in which said localized junction means comprises welding said metallic sheets together in zones.

6. A support as claimed in claim 1, in which said metallic sheets are assembled together by an insetting operation constituting said localized junction means.

7. A support as claimed in claim 1, in which said localized junction means comprises riveting said metallic sheets together.

8. A support as claimed in claim 1, in which said inner and outer plates have portions of bowl-shape.

9. A support as claimed in claim 8, in which the bowl-shaped portions of the two said plates are convex with respect to each other and adjacent, and are fixed to each other constituting said localized junction means.

10. A support as claimed in claim 1, in which at least one of said plates is provided with at least one portion in the form of a setting rim constituting said localized junction means for assembling together said stack.

11. A support as claimed in claim 1, in which at least one of said plates has a thickness of the same order of magnitude as that of said sheets.

12. A support as claimed in claim 1, in which said support is adapted to receive the fixed lining by glueing.

13. A support as claimed in claim 1, in which said support is adapted to receive the fixed lining by anchorage.

14. A support as claimed in claim 1, in which said support is adapted to receive the fixed lining by riveting.

15. A support as claimed in claim 14, in which the same rivets constituting said localized junction means are employed to fix the lining, the sheets and the plates.

16. A support as claimed in claim 1 wherein said brake member comprises a shoe for a disc-brake.

17. A support as claimed in claim 1, wherein said brake member comprises a shoe for a ring-brake.

18. A support as claimed in claim 1, wherein said brake member comprises a jaw of a drum-brake.

19. A support as claimed in claim 1, said stack of sheets and plates having an aperture therethrough, the material of said lining extending through said aperture to fix said lining to said stack of sheets and plates and constituting said localized junction means.

* * * * *